Sept. 8, 1953 W. R. VINCENT 2,651,401
CONVEYER AND TRANSFER APPARATUS
Filed June 25, 1948 2 Sheets-Sheet 1
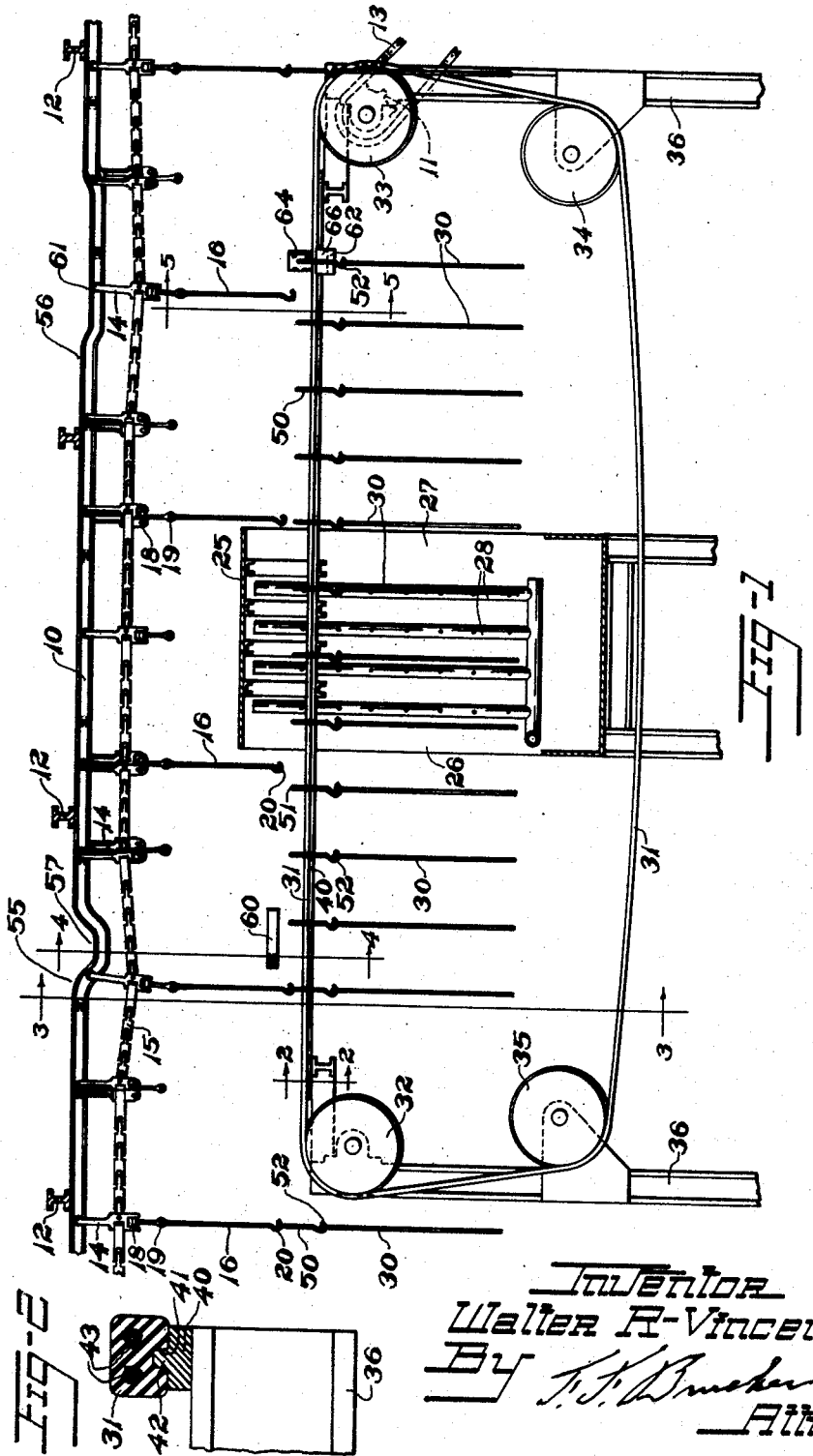
Inventor
Walter R. Vincent Sept. 8, 1953     W. R. VINCENT     2,651,401
CONVEYER AND TRANSFER APPARATUS
Filed June 25, 1948          2 Sheets-Sheet 2
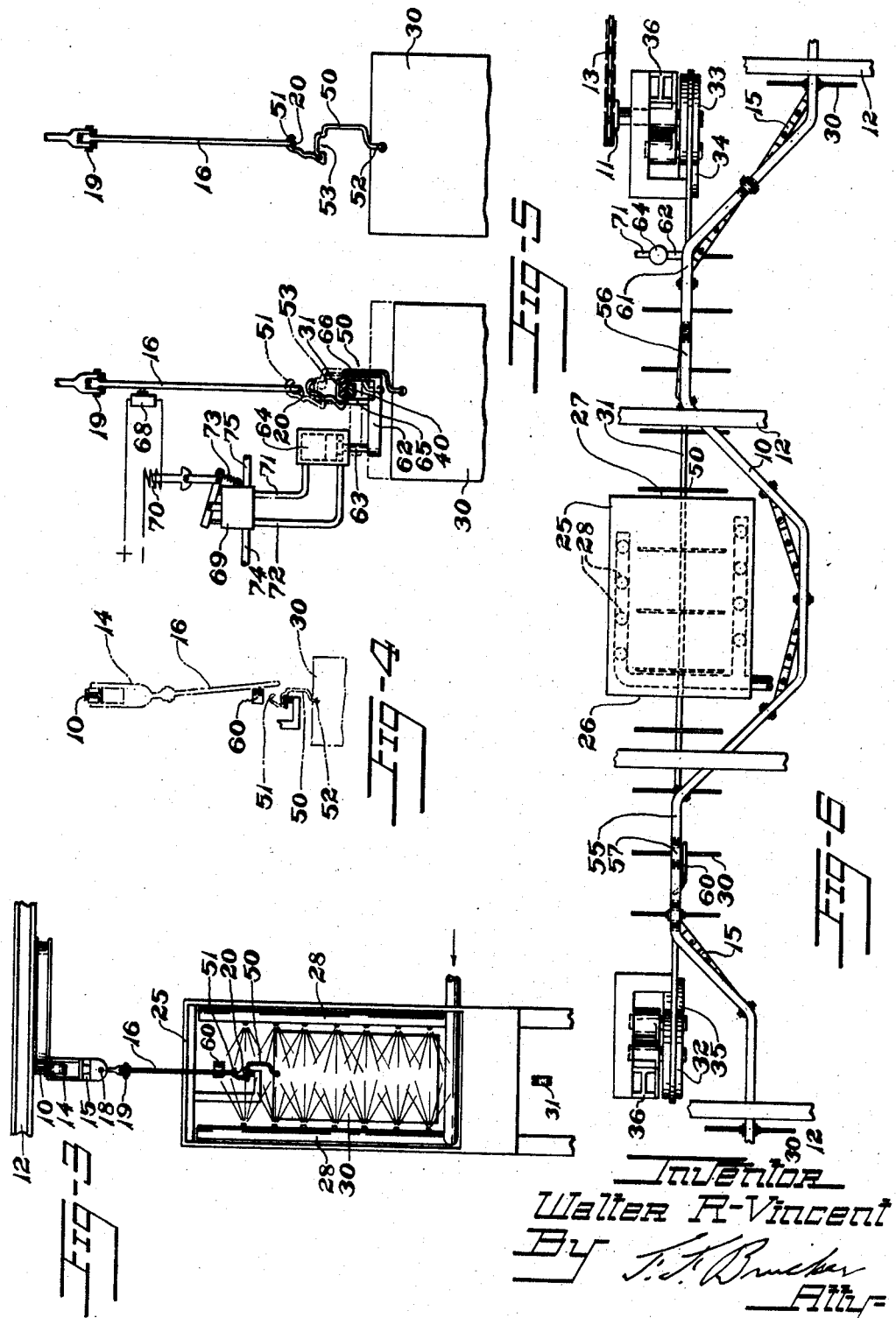

Patented Sept. 8, 1953

2,651,401

UNITED STATES PATENT OFFICE 2,651,401

CONVEYER AND TRANSFER APPARATUS

Walter R. Vincent, Hudson, Ohio, assignor to The B. F. Goodrich Company, New York, N. Y., a corporation of New York Application June 25, 1948, Serial No. 35,082

7 Claims. (Cl. 198—20)

This invention relates to conveyor apparatus and is especially useful where it is desired to transfer work from one conveyor to another.

In the manufacture of articles where the articles are conveyed about a manufacturing plant from one operation to another it has often been necessary to remove the articles from the conveyor in order to perform operations thereon and then to return them to the conveyor, requiring considerable manual handling. At times it has been desirable to transfer the articles to an independent conveyor in order to treat the articles progressively at a different rate of travel, also requiring manual handling.

The present invention has for one of its objects to overcome the foregoing and other difficulties by providing automatic transfer of the articles from one conveyor to another.

Other objects are to provide for transfer of objects from a fast-moving conveyor to a slower conveyor, to transfer the objects from the slower conveyor to the faster conveyor, to change the spacing of the objects from one conveyor to another, to provide for shorter treatment apparatus, to provide for handling sheet articles in closely spaced relation, and to provide corrosion resistant treatment apparatus.

These and other objects will appear from the following description and the accompanying drawings.

Of the drawings,

Fig. 1 is a side elevation of apparatus constructed in accordance with and embodying the invention, parts being broken away.

Fig. 2 is a cross-sectional view, taken on line 2—2 of Fig. 1.

Fig. 3 is a cross-sectional view, taken on line 3—3 of Fig. 1.

Fig. 4 is a cross-sectional view, taken on line 4—4 of Fig. 1.

Fig. 5 is a cross-sectional view, taken on line 5—5 of Fig. 1.

Fig. 6 is a plan view of the apparatus, parts being broken away.

Referring to the drawings, the numeral 10 designates a monorail track supported by cross beams 12. A series of wheeled trollies 14 are suspended therefrom and are connected together in spaced-apart relation by laterally bendable chains 15 whereby they are propelled along the rail 10 from left to right in Figs. 1 and 6. Each trolley 14 pivotally supports a rod 16 mounted for swinging movement forwardly and rearwardly of said rail 10 and also laterally thereof, as by a pair of pivotal joints 18, 19 having crossed axes. Each rod 16 has a forwardly facing hook 20.

Below the conveyor is a treatment chamber 25, for example a spray booth having entrance 26 and exit 27 door openings. Spray pipes 28 are arranged within the booth for treating the articles 30.

For conducting the articles through the treatment chambers, an endless narrow conveyor belt 31 is supported about guiding and driving pulleys 32, 33, 34, 35, rotatably mounted in bearings on a frame 36, so that an upper reach thereof extends through the chamber 25 by way of the doorways 26, 27 and vertically parallel to portions of the rail 10. For supporting the upper reach of the belt, a rail 40 of corrosion-resistant material is supported below the upper reach of the belt 31 by the frame 36. The belt 31 may have a longitudinal groove 41 for engaging over a tongue 42 of the rail for guiding the upper reach of the belt. The belt is of rubber or other rubber-like material resistant to corrosive liquids and having a pair of endless tension-resisting members 43, preferably of wire cable. Provision, not shown, is made for tensioning and driving the belt at a speed slower than that of the trolley conveyor, by means of a sprocket 11 on pulley 33 and a chain 13.

A series of transfer members 50 are provided. These are preferably made of corrosion-resistant wire and are formed at their upper ends each with a hook 51 for engaging a hook 20 of a rod 16, and a hook 52 at its lower end for engaging the article 30. Between these hooks an offset portion 53 is formed by a reverse bend in the wire. The offset potrion 53 is arranged to hang over the conveyor belt 31.

As seen in Fig. 6, the rail 10 is of sinuous form having a straight stretch 55 directly over the conveyor belt 31 between the pulley 32 and the chamber 25, and a second straight stretch 56 over the belt 31 between tht chamber 25 and the pulley 33. Other parts of the rail are offset to one side of the chamber and pulleys to clear them. Now looking at Fig. 1 the rail 10 has a dip 57 within its reach 55 of such depth that as an article 30 is suspended on a transfer member 50, in turn suspended by a rod 16 and trolley 14, approaches the dip 57 it will be moved laterally until its offset 53 is over the belt 31 and in negotiating the dip 57 the hook is lowered into engagement with the belt 31, and the hook 20 of rod 16 is disconnected therefrom. At this position a stationary cam 60 in the path of rods 16 deflects the rod 16 laterally as seen in Fig. 4 while, at the same time, the conveyor chain 15 carries the rod 16 laterally away from the transfer member 50.

At the stretch 56 of the rail 10, a second dip 61 is provided for again lowering the rods 16 to a position such that engagement with the hook 50 is possible within the limit of lift provided by the dimensions of the transfer member 50. A lifting device is provided for elevating the transfer member 50 at this position so that it is engaged by the rod 16. For this purpose, an arm 62 (see Fig. 5) is secured to the vertical piston rod 63 of a double acting fluid pressure operated cylinder 64. The arm 62 is located adjacent the conveyor belt 31 and extends thereunder. It has a pair of fingers 65, 66 one at each side of the belt arranged to engage under a transfer member 50 passing thereover and to lift it off the belt to a position where it will be engaged by the hook 20 of an oncoming rod 16. The cylinder 64 is operated in synchronism with the travel of the overhead conveyor so as to lift each time a rod 16 is over the arm 62. For this purpose a normally open limit switch 68 located above this arm 62 is arranged to energize a solenoid 70 operated four-way valve 69, the delivery pipes 71, 72 of which are connected to the upper and lower ends of the cylinder respectively. A spring 73 on the valve normally holds the valve in position to deliver fluid under pressure from a supply line 74 to the upper end of the cylinder through the pipe 71 and to connect line 72 to the exhaust line 75. Upon arrival of a rod 16 above the lifter 62, the switch 68 is closed, reversing valve 69 and raising the lifter, thereby raising the transfer member 50 to an elevation where hook 20 engages under hook 51 to carry the article 30 away.

The invention makes possible the use of smaller spray chambers for treatment of articles such as metal panels with pickling, cleaning, or coating materials and greatly simplifies the corrosion-resistant equipment for such treatment while eliminating manual transfer of articles to and from the treatment chambers.

Variations may be made without departing from the scope of the invention as it is defined by the following claims.

I claim:

1. Conveyor apparatus comprising a chain propelled conveyor having depending hooked members, transfer members suspendable from said hooked members for carrying articles, guide means engaged by said hooked members for directing them along a devious path having a pair of straight reaches in alignment with each other, a belt conveyor parallel to said reaches, means for advancing said chain propelled conveyor at a speed in excess of the speed of said belt conveyor, said transfer members having offset shoulder portions arranged to project over said belt conveyor at said reaches, means at the first of said reaches for superimposing said offset shoulder portions upon said belt conveyor and laterally deflecting said hooked members to release said transfer members from said hooked members, and means at the second of said reaches for lifting said transfer members from engagement with said belt conveyor into the path of said hooked members for returning said transfer members to said chain conveyor.

2. Conveyor apparatus for treating articles, said apparatus comprising a principal conveyor having depending laterally deflectable hooked members, transfer members suspended from said hooked conveyor members for carrying articles, a second conveyor comprising an acid-resistant rubber belt arranged to support said transfer members independent of the principal conveyor, a rail of corrosion-resistant material for guiding said belt, and means for shifting said transfer members in succession from said principal conveyor to said second conveyor, said means comprising means for guiding said principal conveyor into a reach closely spaced from said second conveyor and superimposed thereover, said transfer members at said reach resting upon said second conveyor and clearing said hooked members of the principal conveyor for lateral swinging movement, and means for laterally deflecting said hooked members at said reach to release said transfer members from said principal conveyor.

3. Conveyor apparatus comprising a principal travelling conveyor having depending hook members swingable laterally of the conveyor, transfer members suspended from said hook members for conveying articles, a secondary conveyor arranged to support and advance transfer members independent of the first said conveyor, the transfer members being shaped to engage any portion of the secondary conveyor along its length by at least partially encircling a portion of the length of the secondary conveyor, means for continuously advancing said secondary conveyor, and transfer means for shifting said transfer members in succession from said principal conveyor to said secondary conveyor during movement of both said conveyors, said transfer means comprising guiding means for directing said conveyors adjacent each other to bring each transfer member successively into encircling engagement with a portion of the secondary conveyor, and means for laterally deflecting said hook member to release each said transfer member from said principal conveyor as it engages its respective portion of the secondary conveyor.

4. Conveyor apparatus comprising a principal travelling conveyor having hook members depending therefrom, transfer members adapted to be suspended from said hook members of said conveyor for carrying articles, a secondary conveyor arranged to support and advance said transfer members independent of the first said conveyor, means for continuously advancing said secondary conveyor, means for shifting said transfer members in succession from said secondary conveyor to said principal conveyor during movement of both said conveyors, said means comprising guiding means for directing said conveyors adjacent each other to bring the path of the hook members toward the path of the transfer members, and means for disengaging each said transfer member from the secondary conveyor to arrest the travelling movement of the transfer member on the secondary conveyor and to hold transfer members substantially stationary in the path of movement of said hook members to effect engagement by a hook member of the principal conveyor.

5. Conveyor apparatus comprising a principal conveyor, a secondary conveyor, a plurality of transfer members for carrying an article, each of which transfer members is interchangeably engageable with each conveyor so that the members may be moved on either conveyor independently of the other conveyor, each transfer member being releasably engageable with the principal conveyor at spaced points along the principal conveyor and releasably engageable with the secondary conveyor at any point along its length, means independent of the principal conveyor for driving the secondary conveyor, a first transfer means for successively shifting the transfer members from the principal conveyor to the secondary conveyor, the first transfer means including means for guiding each transfer member into contact with the secondary conveyor and cam means for releasing the transfer members from said portion of the principal conveyor substantially at its point of contact with the secondary conveyor, and a second transfer means for successively shifting the transfer members from the secondary conveyor to the principal conveyor, said second transfer means including means for disengaging each transfer member to arrest movement of the transfer member in the path of the secondary conveyor and for holding the transfer member substantially stationary in the path of said principal conveyor to effect engagement with one of said spaced points on the principal conveyor.

6. Conveyor apparatus comprising a principal conveyor having depending hook members, transfer members suspended from said hook members for carrying articles, a secondary conveyor comprising a longitudinally movable rubber belt to support the transfer members independently of the principal conveyor, each transfer member being shaped to engage a portion of the upper surface of the belt and to depend from the belt when the transfer members are engaged with the secondary conveyor, means independent of the principal conveyor for driving the secondary conveyor, and means for shifting the transfer members successively from the principal conveyor to the secondary conveyor, said transfer means comprising means for guiding each transfer member into engagement with the belt, and means for disengaging the hook members from the transfer member substantially simultaneously with the engagement of the transfer members with the belt.

7. Conveyor apparatus comprising a principal conveyor having depending hook members, transfer members suspended from said hook members for carrying articles, a secondary conveyor comprising a longitudinally movable rubber belt to support the transfer members independently of the principal conveyor, each transfer member being shaped to engage a portion of the upper surface of the belt and to depend from the belt when the transfer members are engaged with the secondary conveyor, means independent of the principal conveyor for driving the secondary conveyor, and means for shifting the transfer members successively from the principal conveyor to the secondary conveyor, said transfer means comprising means for guiding each transfer member into engagement with the belt, means for disengaging the hook members from the transfer member substantially simultaneously with the engagement of the transfer members with the belt, and means for disengaging the transfer members from the belt at a fixed station in the path of movement of said members on the belt to arrest the movement of the transfer members and discharge the transfer member from the belt.

WALTER R. VINCENT.

References Cited in the file of this patent

UNITED STATES PATENTS

| Number | Name | Date |
| --- | --- | --- |
| 2,153,071 | Bishop | Apr. 4, 1939 |
| 2,335,790 | Ransburg | Nov. 30, 1943 |
| 2,344,155 | McBride et al. | Mar. 14, 1944 |